United States Patent
Hack et al.

(10) Patent No.: US 6,673,129 B2
(45) Date of Patent: Jan. 6, 2004

(54) METHOD OF MANUFACTURING A LITHIUM BATTERY

(75) Inventors: Martinus Jacobus Johannes Hack, Eindhoven (NL); Hans Feil, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 279 days.

(21) Appl. No.: 09/795,018

(22) Filed: Feb. 28, 2001

(65) Prior Publication Data

US 2001/0038944 A1 Nov. 8, 2001

(30) Foreign Application Priority Data

Mar. 3, 2000 (EP) .............................................. 00200761

(51) Int. Cl.⁷ ........................ H01M 10/38; H01M 10/04
(52) U.S. Cl. ..................................... 29/623.4; 29/623.5
(58) Field of Search ................................ 429/127, 129, 429/143, 146, 147, 152, 162, 231.95; 29/623.1–623.5

(56) References Cited

U.S. PATENT DOCUMENTS 6,103,417 A * 8/2000 Rapeli ........................ 429/145
6,432,576 B1 * 8/2002 Hikmet ....................... 429/127

FOREIGN PATENT DOCUMENTS

| EP | 614237 A1 | * | 9/1994 | |
| EP | 0893838 A1 | * | 1/1999 | |
| JP | 59-148280 A | * | 8/1984 | |
| WO | WO0004601 | | 1/2000 | .......... H01M/10/12 |
| WO | WO 00/60690 | * | 10/2000 | |

* cited by examiner

*Primary Examiner*—Susy Tsang-Foster
(74) *Attorney, Agent, or Firm*—Dicran Halajian

(57) ABSTRACT

Disclosed is a method of manufacturing a lithium battery having a stack of a negative electrode, a separator, and a positive electrode. A pattern of holes is produced in the negative electrode as well as in the positive electrode. A polymeric material is applied on at least one side of the stack and the stack is subjected to heat and pressure, so that the polymeric material penetrates the holes, whereby components are stuck and pressed together. The polymeric material includes bulges which are at least partially located at the ends of holes in the electrode (s). The provision of such bulges of polymeric material makes enough polymeric material available to fill the holes and stick together the electrodes and the separator, while on the outer sides of the stack, in between the holes, the polymeric material can be very thin or even be absent.

11 Claims, 1 Drawing Sheet

METHOD OF MANUFACTURING A LITHIUM BATTERY

FIELD OF THE INVENTION

The invention relates to a method of manufacturing a lithium battery comprising a stack of a negative electrode, a separator, and a positive electrode, which method comprises the steps of applying negative electrode material on a negative current collector so as to form the negative electrode, applying positive electrode material on a positive current collector so as to form the positive electrode, and arranging a separator between the negative electrode and the positive electrode, and which method comprises the following steps:

a) producing a pattern of holes in the negative electrode;
b) producing a pattern of holes in the positive electrode;
c) applying a polymeric material on at least one side of the stack and subjecting the stack and the polymeric material to heat and pressure, so that the polymeric material penetrates the hole, whereby which the negative electrode, the positive electrode, and the separator are stuck and pressed together.

BACKGROUND OF THE INVENTION

The growing market for lightweight, portable cordless consumer products, such as CD-players, mobile telephones, laptop computers and video cameras, has increased the need for high-density batteries. Specifically, very thin and flexible batteries are required. If an acceptable portability is to be achieved, the batteries contained in said consumer products should provide the necessary amount of energy at the smallest possible weight and volume. Lithium is a very advantageous material for use in batteries in which a high energy density at a minimum weight is required. However, the thinner the battery, the more difficult the application of a pressure needed to maintain a sufficient contact between the respective components of the battery.

A method of manufacturing a lithium battery according to the preamble is known from the International patent application with publication number 00/04601.

The battery obtained by said method has thin and flexible shape and at the same time provides a very high energy density. Moreover, the contact between the electrodes and the separator is obtained and maintained in a very efficient way. The battery can be packed in a thinwalled canister, as the wall of such canister is not needed for maintaining a sufficient pressure on the respective components of the battery. In one of the methods according to the International application 00/04601, a film of a polymeric material is applied to both sides of the stack, and said polymeric film is subjected to heat and pressure. As a result thereof, the polymeric material melts and penetrates into the holes. A battery is obtained by said method with a polymeric film at both sides of the stack as well as polymeric material in each of the holes acting as a plug or rivet and sticking to the respective layers, causing these layers to be bonded together.

SUMMARY OF THE INVENTION

It is an object of the invention to provide a method of manufacturing a lithium battery according to the preamble by which an even thinner battery can be created.

To this end, the method of manufacturing a lithium battery according to the preamble is characterized in that the polymeric material comprises bulges which are partially located in the holes of the electrode(s).

By providing such bulges of polymeric material at the ends of the holes in the electrode(s), enough polymeric material is provided to fill the holes and stick together the electrodes and the separator, whereas on the outer sides of the stack, in between the holes, the polymeric material may be very thin or even be absent. The battery thus obtained can provide the same amount of energy as the battery obtained according to the prior art method, but at a smaller volume. Thus, the battery obtained according to the method of the present invention has a higher capacity.

In a particular embodiment, the polymeric material comprises a polymer foil which is provided with bulges.

As was mentioned above, the polymer foil itself may be very thin, while the bulges have to comprise enough polymeric material to fill the holes in the electrodes, thereby sticking together the electrodes and the separator.

In a preferred embodiment, the polymeric material is placed on a carrier foil.

Placement of the polymeric material on a carrier foil facilitates the handling thereof. After stacking of the battery, the carrier foil may either be removed or be left in place.

Advantageously, the carrier foil comprises a polymeric material with a high melting point.

If such carrier foil is provided, the carrier foil itself will not melt during the application of heat, whereas the polymeric material will melt, thereby penetrating the holes of the electrodes.

In a further preferred embodiment, the polymeric material is placed in a patterned arrangement of bulges on the carrier foil.

During the application of heat the bulges will melt and penetrate into the holes in the electrodes. Afterwards the carrier foil can be removed. In the battery thus obtained, the polymeric material which has penetrated the holes in the electrodes is substantially not present at the outer sides of the electrodes.

In another advantageous embodiment, the polymeric material is placed in a patterned arrangement of bulges between portions of a carrier.

Also in this case, after the melting of the polymeric material and penetration thereof into the holes, the carrier foil can be removed from inbetween the openings of the holes in the electrodes. A battery is thereby obtained in which the polymeric material which has penetrated the holes in the electrodes is substantially not present at the outer sides of the electrodes.

In the above methods, use is preferably made of a porous polymeric material for the polymeric material which has to enter the holes in the electrodes, e.g. porous polyethylene. Preferably, the polymeric material is elastic. The carrier foil which may be used preferably comprises a strong foil, such as Mylar™ or Kapton™.

The electrode materials can be made by mixing negative or positive active material, conductive material, and binder material, which are all in the form of powder, in a dry process, or in a wet process in which water or an organic solvent is further added.

The paste-like mixture obtained is then provided over the current collector, dried and compressed. For this purpose, one of the following coating methods can be generally employed: screen printing, roller coating, doctor blade coating, knife coating, extrusion coating, bar coating, dip coating and squeeze coating. The thickness of the coated layer, which is compressed after drying, generally is in the range of 1 to 1000 μm.

Pressing of the stack in the above methods is accomplished by simply pressing it for a short period of time between heated metal plates at a pressure of about $5.10^4$ Pa at about 110 to 150° C. The operation may also be carried out using calender rollers. After heating, the stack is cooled down to room temperature. Heating and cooling down may also be carried out in a mold with a particular shape, e.g. the shape of the appliance into which the battery is to be fitted.

In the same way as described above, a multilayer stack of layers can be bonded together in one step, thereby obtaining a battery of increased capacity or voltage.

The lithium battery of the invention can be used in various (cordless) appliances, for example notebook personal computers, portable CD-players, portable telephones, paging equipment, video cameras, electric shavers, electric tools, electric vehicles, and hearing aids. The lithium battery may be used as a primary or as a secondary battery.

BRIEF DESCRIPTION OF THE DRAWINGS

The invention will be elucidated in greater detail by means of an exemplary embodiment and with reference to the accompanying drawings, in which FIG. 1 diagrammatically shows a stack of a negative electrode, a separator and a positive electrode, as well as polymer foil with bulges provided on both sides of the stack.

DETAILED DESCRIPTION OF THE INVENTION

Exemplary Embodiment

Figure 1:
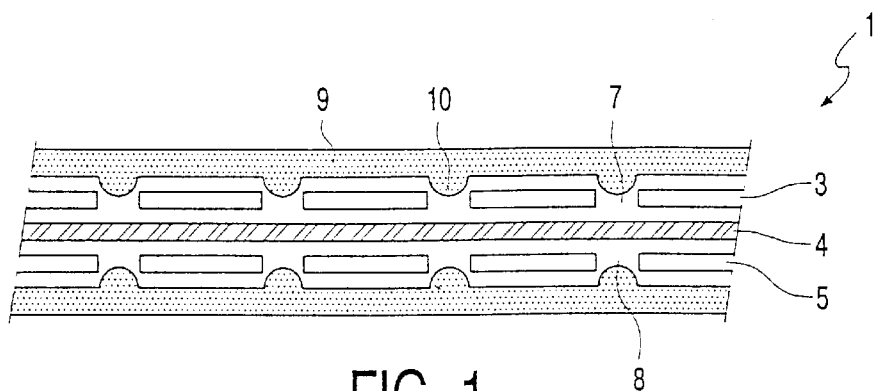

A mixture for the negative electrode material is prepared by mixing 6 g graphite particles having a particle size of 10 μm as the active positive material, 4.5 g carboxymethyl cellulose (1% aqueous solution) and 0.5 g styrene butadiene rubber (60% dispersion in water) as a binder, and formed into a paste to be applied as a coating onto both surfaces of a copper foil current collector. The thickness of the coating is 200 μm. The thickness of the copper foil amounts to 14 μm. The pasted current collector is pre-dried at 85° C. for 15 minutes, heat-treated at 110° C. for 3 hours, and then compressed until the thickness has become 110 μm. The negative electrode is cut out so as to be a square of 2×2 cm².

A mixture for the positive electrode material is prepared by mixing 6 g $LiCoO_2$ as the active positive material, 0.18 g acetylene black as a conductive material, 5 g carboxymethyl cellulose (1% aqueous solution) and 0.7 g polytetrafluoroethylene (60% dispersion in water) as a binder, and formed into a paste to be applied as a coating on both surfaces of an aluminum foil current collector. The thickness of the coating is 420 μm. The thickness of the aluminum foil amounts to 20 μm. The pasted current collector is pre-dried at 85° C. for 15 minutes, heat-treated at 250° C. for 4 hours, and then compressed until the thickness has become 100 μm. The positive electrode is cut out so as to be a square of 2×2 cm².

A 25 μm thick porous polyethylene foil is used as a separator.

The negative electrode and the positive electrode are each provided with a pattern of holes by mechanical punching. The diameter of the holes in the positive electrode preferably is about 1 mm, while the diameter of the holes in the negative electrode preferably is about 0,8 mm. Said difference in diameter is not shown in the Figures. The holes are provided in a two-dimensional array with a mutual hole distance of 5 mm.

A stack is made of the negative electrode 3, the separator 4, and the positive electrode 5. As is shown in the Figures, the negative electrode 3 is provided with holes 7, and the positive electrode 5 is provided with holes 8. A polymer foil 9 is present at both sides of the stack 1, which polymer foil is provided with bulges 10 which are located at the ends of the holes in the electrodes. When the stack is subjected to heat and pressure, the polymeric material will melt, causing at least the bulges of polymeric material to penetrate into the holes, thereby bonding together the electrodes and the separator. The thickness of the layer of polymer foil 9 which remains at the outer sides of the electrodes 3,5 can be considerably reduced compared with the thickness of the polymer foil in the prior art.

Figure 2:
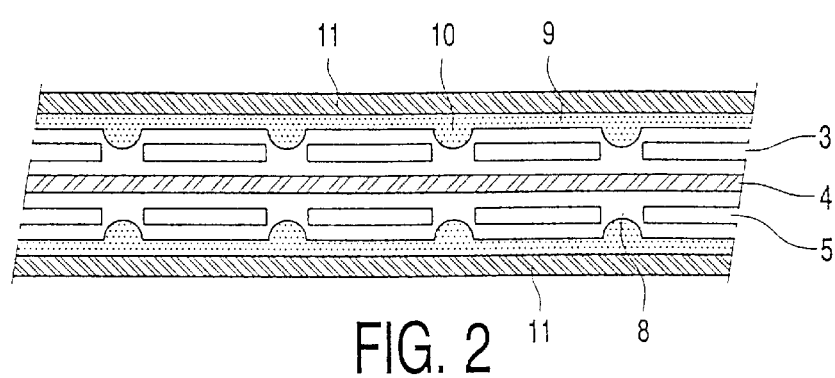
FIG. 2 diagrammatically shows a stack according to FIG. 1, in which the polymer foil is placed on a carrier material.

In FIG. 2, a stack 1 is provided with the so-called bulged foil 9, which is placed on a carrier material 11. The presence of such a carrier foil 11 can facilitate the handling of the polymer foil. Moreover, said carrier foil can be removed after stacking of the battery or after the application of the heat treatment. In the latter case it is important that the carrier foil comprises a material with a high melting point, which melting point is higher than that of the polymeric material of the polymer foil 9. Preferably, the carrier foil comprises a strong polymeric material with a high melting point, such as Mylar™ or Kapton™.

Figure 3:
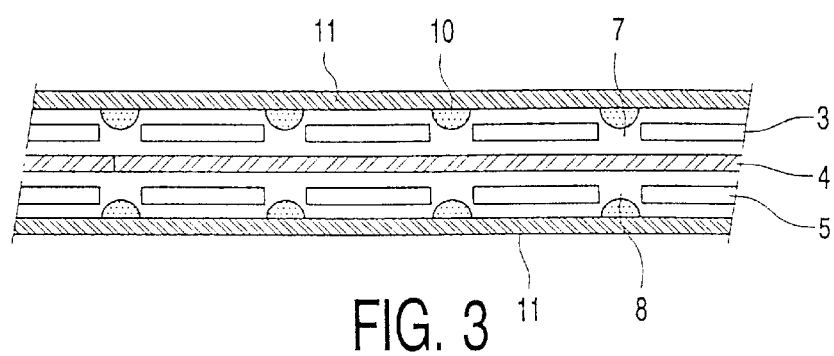
FIG. 3 diagrammatically shows a stack of a negative electrode, a separator and a positive electrode, as well as bulges of polymeric material on a carrier foil on both sides of the stack.

FIG. 3 shows a situation wherein a carrier foil 11 is locally provided with bulges 10 of polymeric material. Preferably, the bulges 10 are located at the ends of the holes in the electrodes 3,5. Also in this case, the carrier foil can be removed after stacking of the battery or after the application of the heat treatment. When the stack has been treated with heat and pressure, substantially all the polymeric bulges 10 will have entered the holes in the electrodes 3,5, leaving substantially none of the same polymeric material at the outer sides of the electrodes.

Figure 4:
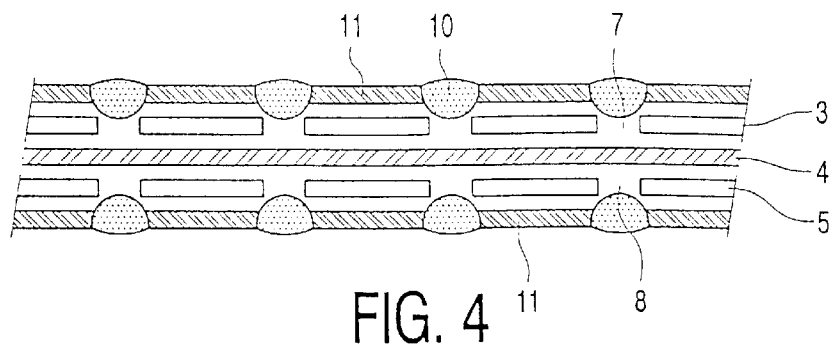
FIG. 4 diagrammatically shows a stack of a negative electrode, a separator and a positive electrode, as well as bulges of polymeric material between portions of a carrier foil on both sides of the stack.

FIG. 4 finally shows a carrier foil which is provided with interposed bulges 10 of polymeric material, on both sides of the stack. Similarly as in the latter case, substantially all the polymeric bulges 10 will have penetrated the holes in the electrodes 3,5, leaving substantially none of the same polymeric material at the outer sides of the electrodes, after the heat treatment.

Although not shown in the Figures, the separator 4 may also be provided with a pattern of holes. Said pattern may correspond to the pattern of holes in both the negative electrode and the positive electrode, so that the melted polymeric material penetrates the holes in the electrodes and the separator through-and-through.

The present invention thus provides a method of manufacturing a lithium battery whereby a very thin battery can be obtained with a higher capacity than the prior art battery.

What is claimed is:

1. A method of manufacturing a lithium battery comprising a stack of a negative electrode, a separator, and a positive electrode, which method comprises the steps of applying negative electrode material on a negative current collector so as to form the negative electrode, applying positive electrode material on a positive current collector so as to form the positive electrode, and arranging a separator between the negative electrode and the positive electrode, and which method further comprises the following steps:

a) producing a pattern of holes in the negative electrode;
b) producing a pattern of holes in the positive electrode;
c) applying a polymeric material on at least one side of the stack and subjecting the stack and the polymeric material to heat and pressure, so that the polymeric material penetrates the holes, whereby the negative electrode, the positive electrode and the separator are stuck and pressed together, wherein prior to said subjecting act, the polymeric material comprises bulges which are partially located in the holes of at least one of the negative electrode and the positive electrode and do not completely fill the holes of at least one of the negative electrode and the positive electrode.

2. A method of manufacturing a lithium battery as claimed in claim 1, wherein the polymeric material comprises a polymer foil provided with bulges.

3. A method of manufacturing a lithium battery as claimed in claim 1, further comprising placing the polymeric material on a carrier foil.

4. A method of manufacturing a lithium battery as claimed in claim 3, wherein the polymeric material is a first polymeric material, and the carrier foil comprises a second polymeric material having a melting point which is higher than a melting point of said first polymeric material.

5. A method of manufacturing a lithium battery as claimed in claim 3, further comprising placing the polymeric material in a patterned arrangement of bulges on the carrier foil.

6. A method of manufacturing a lithium battery as claimed in claim 1, further comprising placing the polymeric material in a patterned arrangement of bulges between portions of a carrier foil.

7. A method of manufacturing a lithium battery comprising:

forming a stack of a negative electrode, a separator, and a positive electrode;

producing a pattern of holes in the negative electrode;

producing a pattern of holes in the positive electrode;

applying bulges of a polymeric material on at least one side of the stack, said bulges being partially located in the holes of at least one of the negative electrode and the positive electrode, said bulges not completely filling the holes; and subjecting the stack and the bulges of the polymeric material to heat and pressure so that the polymeric material penetrates the holes to bond together the negative electrode, the positive electrode and the separator.

8. The method of claim 7, further comprising forming said bulges on a polymer foil.

9. The method of claim 8, further comprising forming said polymer foil on a carrier.

10. The method of claim 7, further comprising forming said bulges on a carrier.

11. The method of claim 7, further comprising forming said bulges between portions of a carrier.

* * * * *